UNITED STATES PATENT OFFICE 2,152,670

PLASTERLIKE PRODUCTS

Richard Stanley Shutt, Chicago, Ill., assignor to E. I. du Pont de Nemours & Company, Wilmington, Del., a corporation of Delaware No Drawing. Application September 15, 1937, Serial No. 164,066

12 Claims. (Cl. 106—94)

This invention relates to new compositions of matter, and more particularly to improved plaster and plaster-like products.

This invention has as its object the preparation of plasters which, after slurrying with water, set rapidly to materials possessing greatly enhanced strength and surface hardness. A further object is to make plasters or plaster-like products possessing the above-mentioned properties available in the convenient form of a dry powder. Other objects will appear hereinafter.

The above objects and other objects appearing hereinafter are accomplished by the process described hereinafter which consists in adding to an inorganic cementitious material the primary, substantially monomeric condensation product of an aldehyde and a urea. In the preferred embodiment the invention consists in adding dimethylol urea to plaster or plaster-like cementitious materials in the dry, powdered state.

Dimethylol urea is the substantially monomeric, primary reaction product obtained by condensing two mols of formaldehyde with one of urea. This product may be prepared by any of several well known processes. It is a white, crystalline substance melting at 126° C. and is soluble in water to the extent of 8–10 parts per 100 parts of water at room temperature.

The cementitious materials used in making my improved products are those usually used in the manufacture of plaster or plaster-like products. I prefer to use calcium sulfate hemihydrate, but other similar materials such as anhydrite, Portland cement, lime, or other cementing agents, either alone or in admixture, may be used.

Improvements in the resulting plaster may be observed with a ratio as low as one part of dimethylol urea to 100 parts of cementing agent. The hardness, strength, and texture of the product produced by slurrying and setting improve as the proportion of dimethylol urea is increased. The working properties of the slurry are also improved, but the setting time of the plaster is not markedly influenced by addition of dimethylol urea.

Remarkable hardness, and a resistance to abrasion almost completely lacking in ordinary plasters, is secured by the addition of as little as 1 part of dimethylol urea to 50 parts of dry plaster. Higher proportions of dimethylol urea, such as 1 or 2 parts for 20 parts of dry plaster, lead to the formation of surfaces sufficiently hard to assume a low luster when polished.

The strength of molded plaster products is also improved by the addition of dimethylol urea. In particular, the weakening effect of rapid drying at elevated temperatures on the tensile strength of plasters is completely avoided by the use of as little as 1 part of dimethylol urea for 50 parts of dry plaster. Thus, the tensile strength of calcium sulfate hemihydrate plaster rapidly dried at 125° C. was doubled by the addition of one part of dimethylol urea for 50 parts of dry plaster. Thus, my invention makes possible the rapid and economical production of plaster products of increased strength, remarkable hardness, and resistance to wear or scratching, by permitting the use of elevated temperatures for drying and curing.

I have found that the objects of the invention are accomplished to a very high degree by adding dimethylol urea in proportions of one part or less of dimethylol urea to ten parts of cementitious material although in certain cases as much as one part of dimethylol urea to two parts of dry plaster may be used. I prefer, therefore, for economic reasons to use dimethylol urea in my invention in proportions of one part or less to ten parts of cementing agent, but I do not wish to limit the invention to such ratios.

In the practice of the invention the dimethylol urea and the cementing agent may be mixed in any known manner. For example, the cementing agent may be gauged with an aqueous solution containing the desired amount of dimethylol urea. Dimethylol urea may also be added as a slurry in water where it is desired to add amounts greater than the limit of solubility in the amount of water used in gauging.

It is preferred, however, to mix the solid dimethylol urea with the dry powdered cementitious material prior to slurrying with water. The addition and mixing may be carried out in a simple manner; as, for example, in a rotating drum. The dimethylol urea may, if desired, be ground in a suitable mill to a finely divided form before addition.

The cementitious mixtures prepared according to the invention may be slurried with water in the usual way. Cellulose pulp, sand, water-soluble softeners such as glycerin, pigments and colors, or other modifying agents known to the art may be added if desired. The slurry may be applied to walls or other surfaces by troweling, or, in the case of slurries sufficiently diluted with water, by brushing or spraying. They may be formed into objects such as panels or blocks in the usual ways, as by allowing the slurries to harden in a mold.

The following examples are illustrative of the processes of this invention:

*Example I*

Three hundred parts of dry calcium sulfate hemihydrate plaster were mixed with 30 parts of dimethylol urea. Water (165 parts) was added and a slurry formed by troweling. The slurry was then poured into molds to form tablets 12" x 2" x ½" and allowed to harden overnight in moist air at about 25° C. The molded products were then dried to constant weight at room temperature and humidity.

The dried molded tablets possessed a hard surface of smooth texture. They were tested for resistance to abrasion as follows:

The surface of the tablet was pressed against a revolving cylindrical steel file by means of a uniform measured mechanical pressure. After 15 minutes the surface of the test piece was only barely perceptibly worn. A similar tablet of calcium sulfate hemihydrate plaster, containing no dimethylol urea, but prepared under otherwise identical conditions, was also tested. After 15 minutes the surface of the test piece was abraded to a depth of ½", the tablet being worn completely through and divided into two pieces.

*Example II*

Two thousand parts of dry calcium sulfate hemihydrate plaster were mixed with 40 parts of dimethylol urea. Water was added (1530 parts) and a slurry formed by troweling. This slurry was poured into briquet molds of the size and shape specified in Am. Soc. Testing Materials Standards, Part II, 25 (1936). The molds were retained in moist air for 10 minutes. The set plaster was then removed from the molds, and the resulting briquets dried at 125° C. for two hours, after which they were allowed to come to constant weight in storage at room temperature and humidity.

The tensile strength was determined by means of a suitable standard testing machine as specified in Am. Soc. Testing Materials Standards, Part II, 26, (1936). The average for several determinations was 392 pounds per square inch. The average for several determinations, using briquets molded from plaster containing no dimethylol urea, but also dried at 125° C. for two hours, was 157 pounds per square inch.

*Example III*

Six hundred parts of Portland cement were mixed with 43 parts of dimethylol urea containing 35 per cent of moisture by weight. The resulting substantially dry mixture was moistened with water to form a slurry slightly more fluid than normal as specified in Am. Soc. Testing Materials Standards, Part II, 18 (1936). The slurry was poured into molds 5" x 5" x ½" and cured 3 days at 90 per cent relative humidity at 30° C. The product was hard and resistant to abrasion, whereas Portland cement products prepared in the same way except that no addition of dimethylol urea was made, could be easily scratched and abraded.

This invention may also be practiced, although usually less advantageously, by replacing the dimethylol urea with monomethylol urea, or with the monomeric condensation product of urea and other aldehydes than formaldehyde. The monomeric condensation products of ureas other than urea itself with formaldehyde or other aldehydes may also replace dimethylol urea in the practice of this invention. The terms "ureas" or "a urea" as used here refer to urea and thiourea and their derivatives such as the monoalkyl and monoacyl ureas and thioureas, or the urethanes and thiourethanes. They also include guanidine and such derivatives as the alkylated or acylated guanidines. Typical examples of compounds coming within the scope of the above definition are urea, thiourea, methyl and ethyl urea, methyl and ethyl thiourea, acetyl urea, guanidine, urethane, etc. In place of formaldehyde other aldehydes such as acetaldehyde may be used in forming the condensation products utilized in the practice of the invention.

The superior strength and resistance to abrasion imparted to cementitious materials by admixture with dimethylol urea in accordance with the practice of this invention is of critical importance in the use of gypsum plaster, which is otherwise limited in application in building and in other arts by an inherent deficiency in strength and hardness. The "dusting" of concrete floors due to abrasion is also overcome by the superior hardness contributed by addition of dimethylol urea according to my invention.

This invention is advantageously practiced not only because of the production of plaster-like products showing marked improvement over those previously made, but also because of the several economic advantages and efficient technological utilization which follow from the fact that dimethylol urea may be added to the inorganic cementitious materials in the dry state. In this way, ready-mixed improved plasters containing the optimum proportions of dimethylol urea for the particular intended use may be made available to the artisan. The necessity of adding and compounding materials at the point of use is completely avoided.

As many apparently widely different embodiments of this invention may be made without departing from the spirit and scope thereof, it is to be understood that I do not limit myself to the specific embodiments thereof except as defined in the appended claims.

I claim:

1. As a new composition of matter, a plaster comprising an inorganic cementitious material and the primary, monomeric reaction product of an aldehyde and a urea.

2. As a new composition of matter, a plaster comprising an inorganic cementitious material and the primary, monomeric reaction product of formaldehyde and a urea.

3. As a new composition of matter, a plaster comprising an inorganic cementitious material and the primary, monomeric reaction product of an aldehyde and urea.

4. As a new composition of matter, a plaster comprising an inorganic cementitious material and dimethylol urea.

5. The composition set forth in claim 1, in which said inorganic cementitious material is calcium sulfate.

6. The composition set forth in claim 4, in which said inorganic cementitious material is calcium sulfate.

7. The composition set forth in claim 4, wherein the dimethylol urea is present in amount from 2 to 10 per cent based upon the weight of the inorganic cementitious material.

8. The composition set forth in claim 6, wherein the dimethylol urea is present in amount from 2 to 10 per cent based upon the weight of the inorganic cementitious material.

9. As a new composition of matter, a plaster comprising a dry, powdered mixture of an inorganic cementitious material and dimethylol urea.

10. The composition set forth in claim 9, in which said inorganic cementitious material is calcium sulfate.

11. In the manufacture of plaster, the step comprising mixing an inorganic cementitious material and dimethylol urea.

12. In the manufacture of a ready-mixed plaster, the step comprising mixing in the dry powdered state an inorganic cementitious material and dimethylol urea.

RICHARD STANLEY SHUTT.